June 12, 1928.
D. F. FESLER
1,673,741
LUBRICATING SYSTEM
Filed May 27, 1922
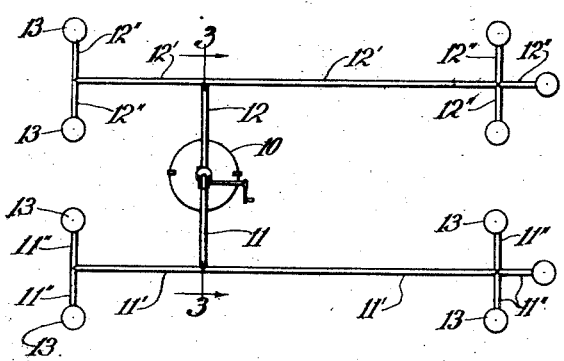
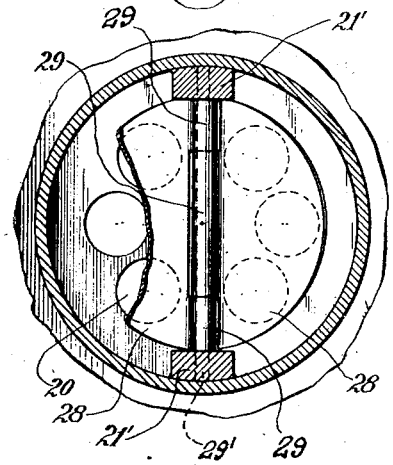
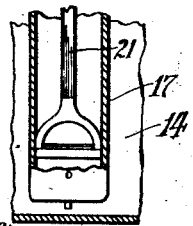
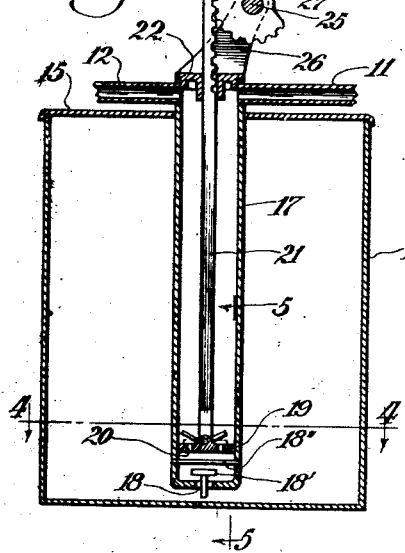
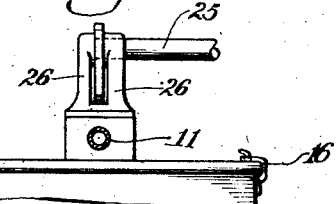
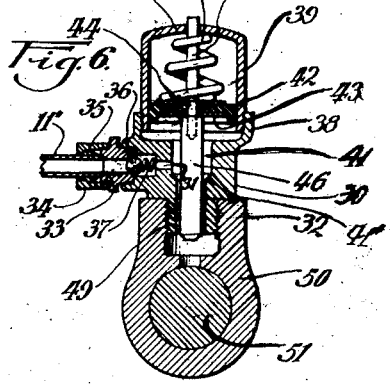
Inventor:
Douglas F. Fesler.

Patented June 12, 1928.

1,673,741

UNITED STATES PATENT OFFICE.

DOUGLAS F. FESLER, OF CHICAGO, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed May 27, 1922. Serial No. 564,043.

My invention relates to improvements in lubricating systems, and is particularly concerned with improvements in lubricating systems of that type in which all of the bearings of the mechanism are lubricated from a single source of lubricant located at some conveniently accessible point.

The objects of my invention are:

First: to provide a lubricating system comprising a single lubricant pump having one or more discharge conduits, each of which comprises one or more branch conduits which end in fittings secured to the various bearings to be lubricated;

Second: to provide a lubricating system of the character described in which the various fittings are so constructed as to insure the proper lubrication of each and all of the bearings;

Third: to provide a system of the character described in which means are provided for insuring the proper distribution of the lubricant irrespective of the varying resistances offered to the passage of lubricant by the different bearings;

Fourth: to provide a system of the character described comprising a periodically operable lubricant pump and means energized by the operation of the pump for providing a continuous supply of lubricant to each of the bearings over a protracted period of time during which the pump itself remains inactive;

Fifth: to provide a lubricating system of the character described comprising novel fittings for connecting the lubricant pump with the bearings; and Finally: to provide a system of the character described which is simple in construction, economical to manufacture, rugged and easy to operate.

Other objects will appear as this description progresses, reference being had to the accompanying drawings, in which Figure 1 is a more or less diagrammatic view illustrating one embodiment of my improved lubricating system, the pump and fittings being shown in plan;

Figure 2 is a side elevation of the upper portion of the pump forming a part of my improved lubricating system;

Figure 3 is a central vertical section;

Figure 4 is a horizontal transverse section taken on line 4—4 of Figure 3, but shown on an enlarged scale;

Figure 5 is a sectional detail taken on line 5—5 of Figure 3; and

Figure 6 is a central vertical section through one of the fittings forming a part of my improved lubricating system, which fitting is shown attached to a bearing.

Throughout the several views, similar reference characters will be used for referring to similar parts, and the several sections are taken looking in the directions of the small arrows.

My improved lubricating system comprises in general a pump 10, having a plurality of discharge conduits 11 and 12 which may respectively comprise branches 11' and 12', and each of these branches may comprise a plurality of branches 11'' and 12'', respectively. At the end of each of the last mentioned branches, and in communication therewith, are the fittings 13, which are adapted to be connected with the bearings to be lubricated.

While any type of lubricant compressor or pump may be used as a part of my improved lubricating system, I prefer to use a pump which is, or can be, periodically operated to place the lubricant in the system under comparatively high pressure. In this application I have illustrated one form of pump suitable for this purpose, which comprises a suitable container 14 for holding a supply of lubricant. This container is provided with a removable cover 15 which may be held in place by clamps 16 of any suitable construction. A tube 17 is mounted in, and extends through, the cover 15 and forms the cylinder of the pump. Slidably mounted in this tube or cylinder 17, which is provided at its lower end with the opening 18, is a disc piston 19 in which are formed a plurality of ports 20. A check valve 18', the upper limit of travel of which is determined by a pin 18'', prevents reverse flow of lubricant through the opening 18. The piston 19 is provided with a piston rod 21 which extends through the cap 22 on the outer end of the cylinder 17. The outer end of the piston rod 21 is provided with rack teeth 23 for coacting with the teeth of the mutilated gear 24. This gear is mounted on a shaft 25 supported by the brackets 26 extending upwardly and outwardly from the cap 22. The shaft 25 extends outwardly beyond one of the brackets 26 and is provided with a suitable handle 27 by means of which the shaft, and, consequently, the mutilated gear 24, can be oscillated. The discharge conduits 11 and 12 communicate with the upper end of the cylinder 17, as shown in Figure 3.

From the above description it will be clear that, when the piston 19 is moved downwardly in the cylinder 17, the valve 18' will close the opening 18 and the lubricant will pass through the ports 20 of the piston to the upper side thereof. When the piston 19 is then moved upwardly, a new supply of lubricant will be drawn into the lower end of the cylinder 17 and, when the piston 19 is again moved downwardly, this new supply of lubricant will move through the openings 20 to a position above the piston 19. To prevent the lubricant from returning through the openings 20, I make use of a pair of semi-circular flap valves 28, the inner edges of which are provided with the eyes 29 for receiving the pintle 29', the ends of which are secured in suitable bores in the bifurcations 21' of the lower end of the piston rod 21. From the above description, it will be clear that, by oscillating the handle 27, successive charges of lubricant will be forced into the cylinder 17 and out through the pipes 11 and 12, and the various branch conduits in communication with these pipes, and that the lubricant can be forced into these branches under very considerable pressure, depending upon the cross sectional area of the cylinder 17, the length of the handle 27, etc.

The fittings 13 at the end of each of the branch conduits 11", 12" each comprises a body member 30 having an inlet port 31 and an outlet port 32. The inlet port 31 is connected with one of the conduits 11", 12" by a suitable union 33, gland 34 and gasket 35 (see Figure 6). A check valve 36, yieldingly held against the inner end of the union 33 by the spring 37, prevents return flow through the inlet port 31. The upper end of the body member 30 is shown as being provided with an internally threaded annular flange 38, to which is secured the lubricant receptacle 39 which is closed at its outer end 40 and the inner end of which communicates with the bore 41 in the body member 30, which bore in turn is in communication with both the inlet and the outlet ports 31 and 32.

A plunger comprising a cup leather 42, the face plate 43 and the follower plate 44 is slidably mounted in the cylinder 39.

A rod 45, the lower end of which is reduced in diameter and threaded, extends through the cup leather 42, the face plate 43 and the follower plate 44, and screws into the upper end of the rod, pin or stem 46, which extends through the bores 41 and 32. The upper end of the rod extends through an opening in the top of the receptacle 39 and forms means for indicating the amount of lubricant in the receptacle. A spiral spring 47, interposed between the follower plate 44 and the end 40 of the lubricant receptacle, provides means for yieldingly urging the plunger toward the discharge outlet 32. The lower end of the rod 46 is tapered to coact with the tapered portion 41' of the bore 41 to provide an enlarged passageway for the passage of dirt when the plunger is held in its raised position by the pressure of the lubricant during the filling of the cup.

I have illustrated the body member 30 as being provided with a threaded boss 49 through which the outlet port 32 extends and which provides means for attaching the fitting to a bearing 50 in which is journaled a movable element 51.

When it is desired to lubricate a mechanism provided with my improved lubricating system, the operator merely oscillates the handle 27, whereupon lubricant is forced outwardly through the various pipes 11, 12, 11', 12' and the branch conduits 11", 12" and through the discharge ports 32. The bores 32 of the various fittings and the stems or rods 46 are of such relative proportions that the clearance between these two members is very small and, consequently, offers comparatively high resistances to the passage of lubricant therethrough. This means that when the lubricant, through the action of the pump, is forced through the inlet port 31 into the bore 41, the lubricant will back up in the bore 41 and press against the inner side of the plunger in the lubricant receptacle 39 and cause it to move outwardly against the tension of the spring 45. This movement of the plungers in the various receptacles will continue until all of the receptacles have been completely filled with lubricant and further outward movement of the plungers is impossible. If the operator then continues to actuate the pump, the pressure on the lubricant will increase until it is forced outwardly through the spaces between the various stems or rods 46 and the walls of the corresponding bores 32 and into the bearings, where the new lubricant will displace the old, used lubricant. When this has been accomplished, the operator ceases the actuation of the pump. The above operations are preferably performed while the mechanism is not in motion, at which time the resistance to the passage of lubricant through the various bearings is at a maximum. As soon as the mechanism is placed in operation, the resistance of the various bearings to the passage of lubricant will at once decrease and the tension of the various springs 47 will be sufficient to slowly feed lubricant through the inlet bores 32 into the various bearings over a protracted period of time, the length of which will depend upon the tension of the springs 47 and the clearance between the stems 46 and the walls of the outlet bores 32. These two factors can be varied as desired, so as to lengthen or shorten the period during which lubricant will be continuously and automatically supplied to the bearings from the receptacles 39.

By the construction illustrated, a certain amount of vibration of the rod or stem 46 is permitted, which vibration assists the passage of lubricant from the receptacles 39 into the bearings. The check valve 36 will prevent the return flow of lubricant through the inlet ports under the action of the plungers 42.

The space between the stems 46 and the walls of the bores 32 will vary considerably with the kind of lubricant used. To those skilled in this art, it will be clear that this space can be made considerably smaller with oils than with the greases and other heavy lubricants.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricating system comprising a source of lubricant, means for placing said lubricant under pressure, a conduit extending from said last named means, said conduit having a plurality of branches, each ending in a fitting comprising, a body member having communicating inlet and outlet bores, a non return valve in said inlet bore, a lubricant receptacle communicating with said bores, a plunger slidable in said lubricant receptacle and having a stem projecting into said outlet bore and coacting with the walls thereof to form a high resistance discharge passageway for said lubricant receptacle, and a spring for moving said plunger to discharge lubricant from said lubricant receptacle through said outlet bore.

2. A lubricating system comprising a lubricant pump having a discharge conduit comprising a plurality of branches, a fitting for each branch comprising a body member having an inlet bore communicating with said branch and an outlet bore for supplying lubricant to a bearing, a non return valve in said inlet bore, said outlet bore offering an automatically variable high resistance to the passage of lubricant therethrough, a plunger slidable in said lubricant receptacle, and a spring for urging said plunger in a direction to force lubricant through said outlet bore.

3. A fitting for a lubricating system comprising a receptacle having a discharge bore, a plunger slidable in said receptacle and having a stem secured thereto and loosely projecting into said bore, and a spring for urging said plunger in a direction to discharge lubricant through said outlet, said stem restricting the size of said bore, a portion of said stem and said bore being so conformed relatively to each other that when said stem is raised against the tension of said spring the passageway through said discharge bore is enlarged to permit the passage of particles of dirt contained in the grease.

4. A fitting for a lubricating system comprising a receptacle having a discharge bore comprising an inner portion and an outer portion of reduced diameter, the two portions being connected by a tapered portion, a plunger slidable in said receptacle and having a stem secured thereto and loosely projecting into said bore, and means for urging said stem into said bore, said stem having a tapered portion for coacting with the tapered portion of the bore to enlarge the discharge passageway when said plunger is raised to a predetermined position.

5. A fitting for a lubricating system comprising a receptacle having a discharge bore comprising an inner portion and an outer portion of reduced diameter, the two portions being connected by a tapered portion, a plunger slidable in said receptacle and having a stem secured thereto and loosely projecting into said bore, and means for urging said stem into said bore, the movement of said plunger being such as to permit the end of the stem to be moved to a position opposite the tapered portion of said bore.

6. A fitting for a lubricating system comprising a receptacle having a discharge bore, a plunger slidable in said receptacle and having a stem secured thereto and loosely projecting into said bore, and means for urging said stem into said bore, said stem and bore being provided with co-acting portions for producing an enlarged passageway when said plunger is moved to a position of increased volume of said receptacle near the upper end of the plunger stroke.

7. A fitting for a lubricating system comprising a cup-shaped lubricant receptacle, a plunger slidable therein, inlet and outlet passage means for said receptacle, and a rod on said plunger extending through one side of said cup-shaped receptacle for indicating the position of said plunger, said rod extending also into said outlet passage to constrict the same.

8. A lubricating system comprising a plurality of bearings to be lubricated, a source of lubricant remote from said bearings, a conduit for conveying lubricant from said source to said bearings, said conduit comprising a branch conduit leading to each bearing, a fitting interposed between each branch conduit and the corresponding bearing, each of said fittings having a bore communicating with the corresponding branch conduit, a rod extending into said bore and forming an annular passageway for resisting the flow of lubricant, a check valve for preventing return flow through said branch conduit, spring actuated means for forcing lubricant through said passageway, and manually actuated means located near said source of lubricant for energizing said spring means.

9. A lubricating system comprising a plurality of bearings to be lubricated, a source of lubricant remote from said bearings, a conduit for conveying lubricant from said source to said bearings, said conduit comprising a branch conduit leading to each bearing, a fitting interposed between each branch conduit and the corresponding bearing, each of said fittings having a bore communicating with the corresponding branch conduit, a rod extending into said bore but out of contact with the walls thereof to form a restricted passageway for resisting the flow of lubricant, spring actuated means for forcing lubricant through said passageway, and means located near said source of lubricant for energizing said spring means.

10. A lubricating system comprising a bearing, a source of lubricant remote from said bearing, a conduit leading from said source of lubricant, a fitting for establishing communication between said conduit and said bearing, said fitting having a bore, a rod in said bore forming a restricted and constantly open passageway for the passage of lubricant, and a spring actuated plunger for forcing lubricant through said passageway, and means adjacent said source of lubricant for energizing the spring of said spring actuated plunger.

11. A lubricating system comprising a plurality of bearings to be lubricated, a lubricant container situated remotely from said bearings, means for receiving lubricant from said container and storing it under pressure, and means for conducting lubricant from said storing means to said bearings, each comprising a fitting having a bore therethrough, a rod extending into said bore to form a restricted and constantly open passageway, and manually actuated means between said container and said fitting for transferring lubricant from said container to said storing means.

12. In a central lubricating system, the combination of a manually operable lubricant compressor adapted to be intermittently operated, a plurality of bearings to be lubricated, a branched conduit connecting said compressor with said bearings, a substantially cylindrical bore in said conduit adjacent each of said bearings, a pin partially filling said bore, the space between said bore and pin forming a restricted flow resistant passageway, said pin being adapted to be moved longitudinally from normal position upon flow of lubricant under pressure in said conduit, and a spring tending to hold said pin in normal position.

13. In a central lubricating system, the combination of a plurality of bearings to be lubricated, an intermittently operable lubricant compressor, a branched conduit system connected to said compressor, and a lubricant flow resistant fitting associated with each of said bearings and connected to said conduit system, said fitting comprising a cylindrical bore, a pin of slightly smaller diameter than said bore and longitudinally movable therein in one direction upon application of lubricant pressure, resilient means for moving said pin in the opposite direction, and a check valve to prevent flow from the bearing to the conduit system.

In witness whereof, I hereunto subscribe my name this 19th day of May, 1922.

DOUGLAS F. FESLER.